United States Patent
Milojicic et al.

(10) Patent No.: US 10,795,782 B2
(45) Date of Patent: Oct. 6, 2020

(54) DATA PROCESSING APPARATUSES AND METHODS TO SUPPORT TRANSFERRING CONTROL BETWEEN A PRIMARY DATA PROCESSING SYSTEM AND A SECONDARY DATA PROCESSING SYSTEM IN RESPONSE TO AN EVENT

(71) Applicant: Hewlett Packard Enterprise Development LP, Houston, TX (US)

(72) Inventors: Dejan S. Milojicic, Palo Alto, CA (US); Keith Packard, Ft. Collins, CO (US); Michael Woodacre, Winchester Hampshire (GB); Andrew R. Wheeler, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 153 days.

(21) Appl. No.: 15/942,925

(22) Filed: Apr. 2, 2018

(65) Prior Publication Data

US 2019/0303249 A1 Oct. 3, 2019

(51) Int. Cl.
*G06F 11/00* (2006.01)
*G06F 11/14* (2006.01)

(52) U.S. Cl.
CPC ...... *G06F 11/1471* (2013.01); *G06F 2201/82* (2013.01)

(58) Field of Classification Search
CPC .................. G06F 11/1471; G06F 2201/82
See application file for complete search history.

(56) References Cited

U.S. PATENT DOCUMENTS

| | | | |
|---|---|---|---|
| 5,812,751 A * | 9/1998 | Ekrot | G06F 11/2033 714/13 |
| 6,622,263 B1 | 9/2003 | Stiffler et al. | |
| 7,613,947 B1 * | 11/2009 | Coatney | G06F 11/0727 714/6.1 |
| 7,730,153 B1 * | 6/2010 | Gole | G06F 11/2028 709/215 |
| 9,069,701 B2 | 6/2015 | Guthrie et al. | |
| 9,311,242 B1 | 4/2016 | Banerjee | |
| 9,703,701 B2 | 7/2017 | Voigt | |
| 2004/0215998 A1 * | 10/2004 | Buxton | G06F 11/1402 714/2 |

(Continued)

OTHER PUBLICATIONS

Zhang, Y. et al,, "Mojim: A Reliable and Highly-available Non-volatile Memory System"; Mar. 14-18, 2015; 16 pages.

*Primary Examiner* — Jonathan D Gibson

(57) ABSTRACT

Example implementations relate to an apparatus to support providing a computing service to a client including transferring control between a primary data processing system and a secondary data processing system in response to an event; the primary data processing system comprising a processor and associated memory and the secondary data processing system comprising a processor and associated memory; the apparatus comprising: circuitry to identify restoration data; the restoration data comprising at least data associated with at least one predetermined type of memory operation of the memory associated with the primary data processing system, and circuitry to output any identified restoration data for storage in the memory associated with the processor of the secondary data processing system.

17 Claims, 7 Drawing Sheets

(56) References Cited

U.S. PATENT DOCUMENTS

| | | | |
|---|---|---|---|
| 2011/0082832 A1* | 4/2011 | Vadali | G06F 11/1469 |
| | | | 707/615 |
| 2015/0095585 A1 | 4/2015 | Subrahmanyam et al. | |
| 2015/0261633 A1* | 9/2015 | Usgaonkar | G06F 11/2064 |
| | | | 714/6.3 |
| 2017/0364426 A1* | 12/2017 | Blea | G06F 11/14 |
| 2018/0095845 A1* | 4/2018 | Sanakkayala | G06F 11/3495 |
| 2018/0285223 A1* | 10/2018 | McBride | G06F 11/2082 |

* cited by examiner

DATA PROCESSING APPARATUSES AND METHODS TO SUPPORT TRANSFERRING CONTROL BETWEEN A PRIMARY DATA PROCESSING SYSTEM AND A SECONDARY DATA PROCESSING SYSTEM IN RESPONSE TO AN EVENT

Services hosted in data centers are complex and comprise many components with respective dependences. Due to numerous factors such as, for example, earthquakes, inclement weather, terrorist and technological threats such as security violations and malware that change a system's state, data centers are exposed to unpredictable failures. Unpredictable failures can be accommodated by providing redundancy or back-up systems. Such systems can be in geographically different locations. Providing such redundancy or back-up systems has been realized by replicating some of the critical databases of one data centre and then restarting or failing over remaining non-critical aspects of the data centre such as, for example, web servers and services, business servers and storage servers. Failover of a whole data centre could take a significant amount of time such as hours or days. Hitherto such a failover was accomplished in a loose coupling of two different locations, iteratively restarting predefined servers, replicating critical databases; all of which bears the concomitant risk of losing some state information in the process.

BRIEF DESCRIPTION OF THE DRAWINGS

Various implementations are described, by way of example, referring to the accompanying drawings, in which.

DETAILED DESCRIPTION

Figure 1:
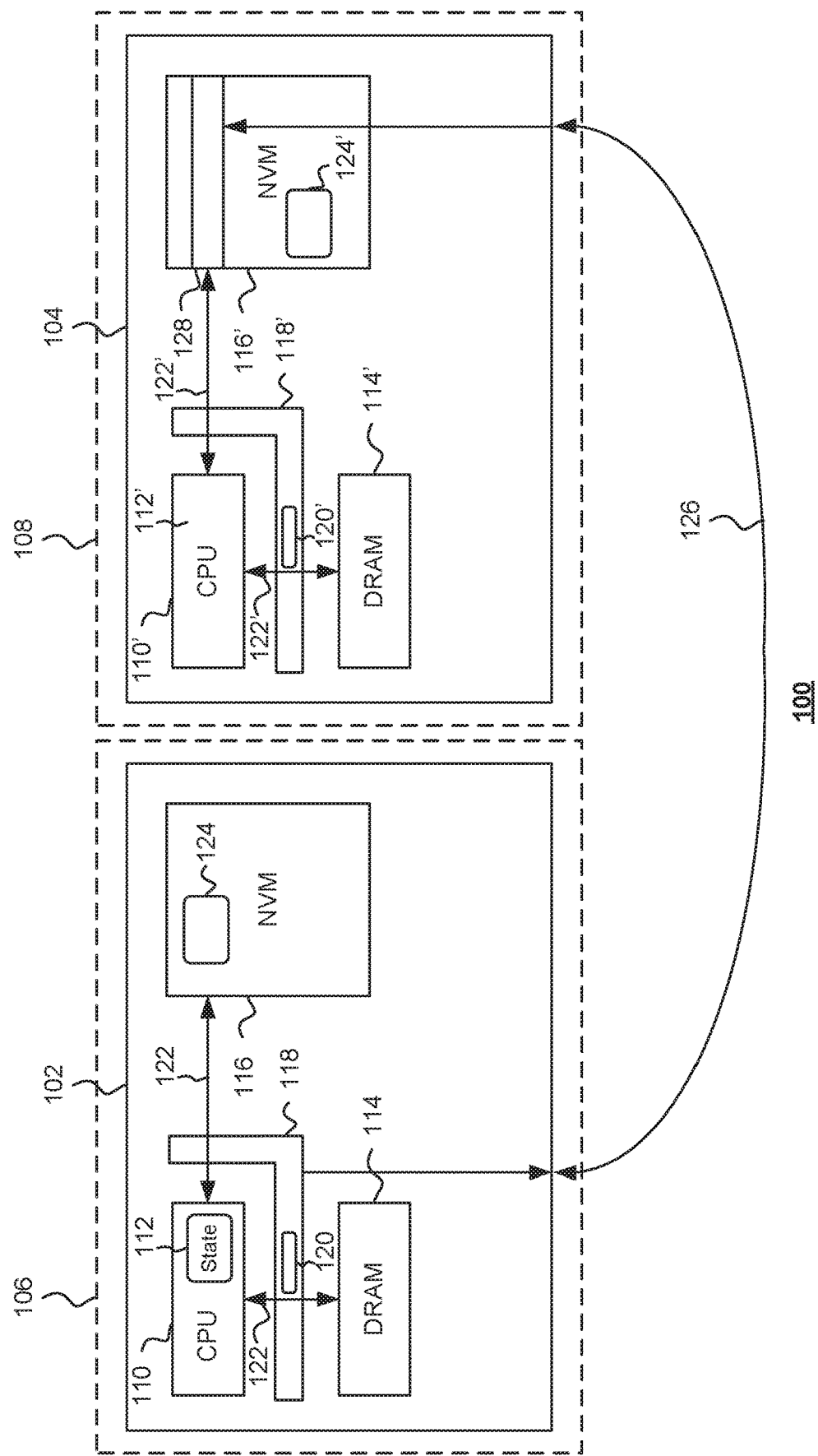
FIG. 1 shows primary and secondary data processing systems according to example implementations.

Referring to FIG. 1, there is shown a view 100 of primary 102 and secondary 104 data processing systems according to example implementations. The primary and secondary data processing systems 102 and 104 can be co-located, that is, located within the same geographical area such as, for example, within the same data processing centre. Alternatively, the primary and secondary 102 and 104 data processing systems can be located at different geographical locations such as, for example, within respective data processing centers. In the example depicted the primary data processing system 102 is located within a primary data processing centre 106. Similarly, the secondary data processing system 104 is located within a secondary data processing centre 108.

The primary data processing system 102 comprises a processor 110. The processor 110 can be arranged to execute or otherwise implement a transaction or a number of transactions of a computer service. The computer service can be any computer service such as, for example, a data management service such as a database. The processor 110 comprises state information 112. The state information 112 can comprise information relating to the state of the processor 110 such as, for example, the state of any registers, stacks, data structures, processor memory or any other information relating to the processor 110 taken jointly and severally in any and all permutations.

The primary data processing system 102 also comprises a memory or storage. In the example depicted, the memory or storage comprises a volatile memory such as, for example, a DRAM memory 114. In the example depicted the memory or storage also comprises a nonvolatile memory (NVM) 116. The DRAM memory 114 is used to store transient data associated with the computer service. The nonvolatile memory 116 is used to store persistent data associated with the computer service. The persistent data can be used to recover the computer service to a transaction consistent state. Alternatively, or additionally, the consistent data is used to provide a transaction consistent state for the computer service.

The primary data processing system 102 further comprises a monitor 118. The monitor 118 is arranged to collate or otherwise identify at least one or more than one predetermined type of data that can be used to support or otherwise restore the computer service in the event of a failure when that computer service associated with the primary data processing system 102. Example implementations can be realized in which the monitor 118 monitors data associated with at least a predetermined type of memory operation of the volatile memory 114 associated with the processor 110 or state information 112 associated with the processor 110. The data associated with at least one of a predetermined type of memory operation of the volatile memory 114 associated with the processor 110 or the state information 112 is an example of restoration data. The restoration data is an example of data associated with a current transaction that has yet to be completed or committed. The restoration data is used to reconstruct or rebuild a currently executing transaction in the event of the primary data processing system 102 failing to complete or commit that current transaction.

The monitor 118 is arranged to monitor exchanges between the processor 110 and the volatile memory 114. For example, the monitor 118 may monitor or otherwise identify a read, write, or other memory related instruction 120 and to output such a read, write, or other memory related instruction, or data derived from the foregoing, for storage or other processing by the secondary data processing system 104.

The monitor 118 can be arranged to accumulate or otherwise transfer such restoration data until a currently executing transaction has completed or otherwise committed and/or that the committed current transaction has also been output or otherwise stored in a manner to allow the computing service to be restored to a transaction consistent state in the event of failure of the primary data processing system 102.

The monitor 118 can be realized in the form of hardware, software or a combination of hardware and software. The monitor 118 can accumulate the state information 112 by, for example, placing the processor 110 in a trace mode using appropriate data or software such as, for example, TRACE32 assuming that the processor 110 is an ARM processor. The monitor 118 can accumulate memory related restoration data such as the above-described read, write, or other memory related instruction, by monitoring at least one, or both, of the address bus or data bus 122 used by the processor 110 to access the volatile memory 114. The monitor 118 can realize accumulating the memory related restoration data in a number of ways. For example, the monitor 118 can be coupled to at least one, or both, of the address bus or data bus 122 in such a way that it can read at least one of, or both of, addresses on the address bus or data on the data bus 122. Alternatively, the monitor 118 can be interposed between the processor 110 and the volatile memory 114 so that at least one, or both, of the address bus or data bus 122 pass through the monitor 118.

The nonvolatile memory 116 is used to store persistent data 124 in a transaction consistent state.

The restoration data is output by the monitor 118 for transfer from the primary data processing system 102 to the secondary data processing system 104 via a communication link 126.

The secondary data processing system 104 is a mirror image of the primary data processing system 102. Therefore, the secondary data processing system 104 comprises a respective processor 110', volatile memory 114', nonvolatile memory 116' and a respective monitor 118'.

The restoration data 128 received by the secondary data processing system 104 is stored in the nonvolatile memory 116'. Additionally, or alternatively, the nonvolatile memory 116' of the second data processing system 104 also comprises a copy 124' of transaction consistent persistent data 124.

Therefore, in the event of a failure associated with the primary data processing system 102, the restoration data 128 can be used to place the secondary data processing system 104 in a state corresponding to that immediately before the failure associated with the primary data processing system 102. Placing the secondary data processing system 104 into such a state corresponding to that immediately before the failure associated with the primary data processing system 102 can comprise using the restoration data 128 to place at least one, or both, of the processor 110' or volatile memory 114' into a condition or state corresponding to at least one, or both, of the processor 110 or volatile memory 114 of the primary data processing system 102 at the point of, or immediately preceding, the failure of, or associated with, the primary data processing system 102.

Figure 2:
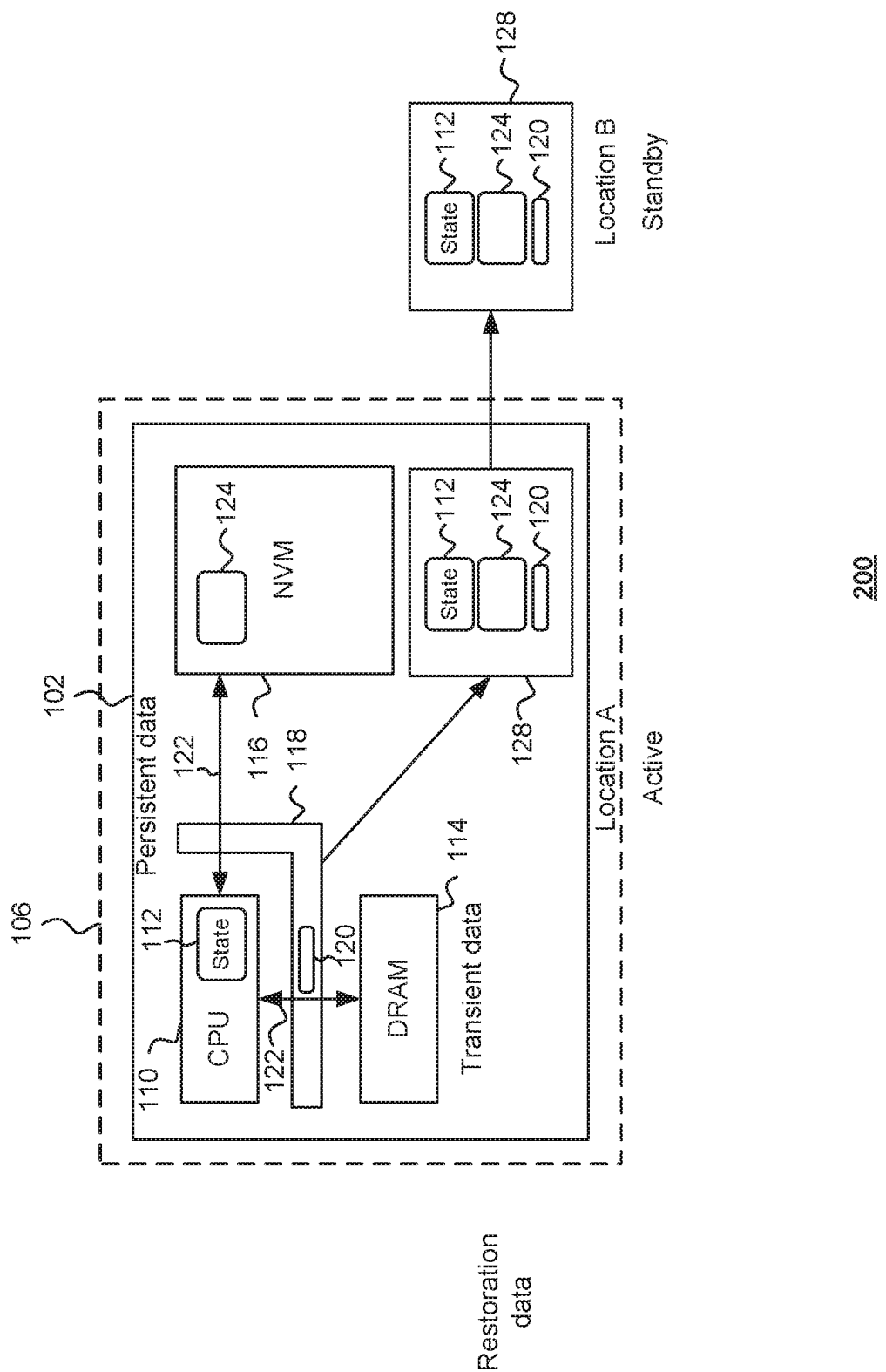
FIG. 2 depicts a primary data processing system according to example implementations.

Referring to FIG. 2, there is shown a view 200 of the primary data processing system 102 according to example implementations. Reference numerals common to FIGS. 1 and 2 relate to the same entities. It can be appreciated that the restoration data 128 can comprise at least one or more than one of state information 112, memory information 120 or transaction consistent persistent data 124, taken jointly or severally in any or all permutations.

Figure 3:
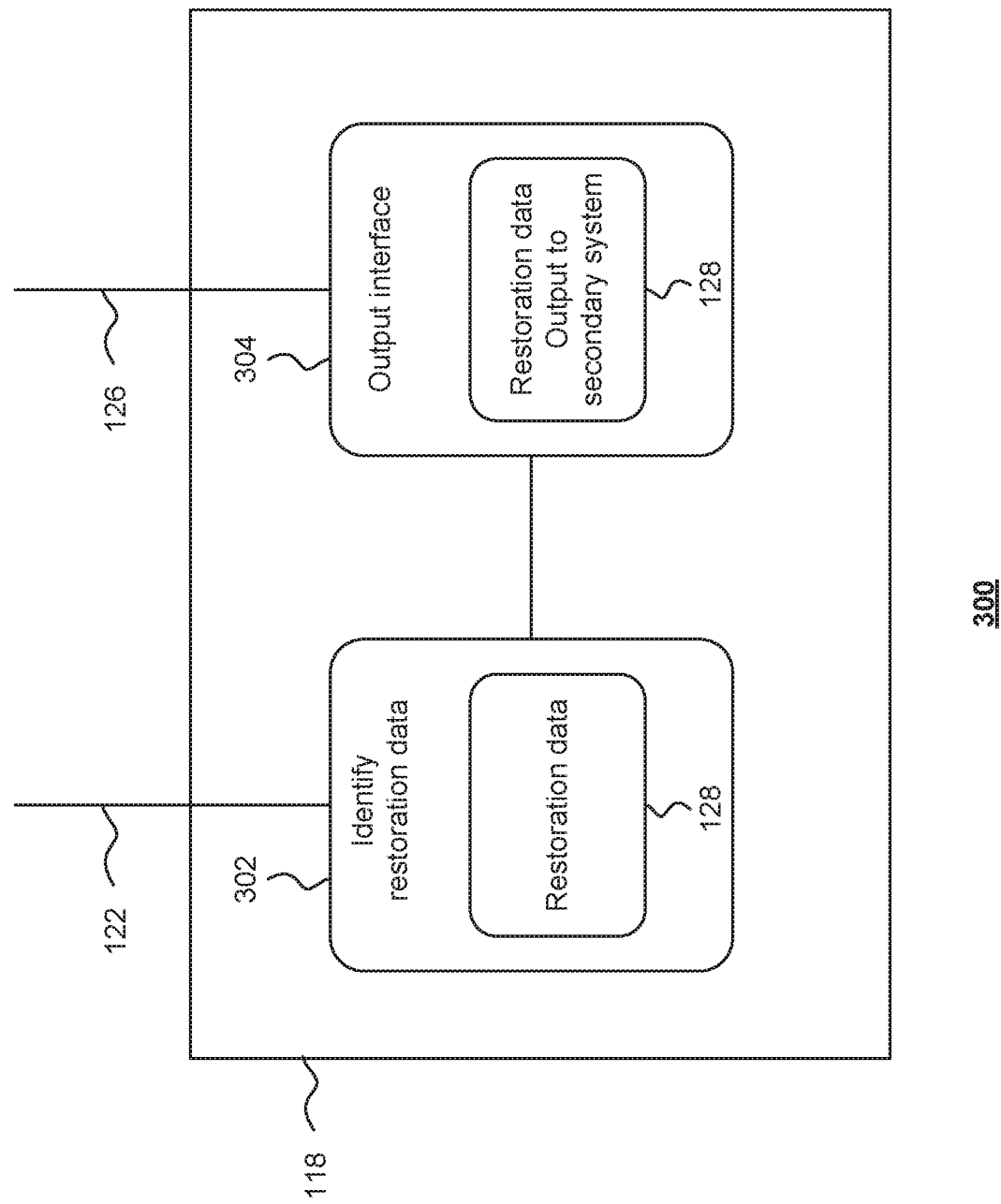
FIG. 3 illustrates a monitor of a primary processing system according to example implementations.

Referring to FIG. 3, there is shown a view 300 of the monitor of the primary processing system 102 according to example implementations. The monitor 118 can comprise circuitry 302 arranged to identify restoration data 128; the restoration data 128 comprising at least one, or both, of data associated with at least one predetermined type of memory operation of the memory associated with the processor 110 of the primary data processing system 102 or state information 112 associated with the processor 110 of the primary data processing system 102. Additionally, or alternatively, the restoration data 128 can comprise transaction consistent persistent data 124. It can be appreciated that the circuitry 302 is coupled to, or otherwise has access to, at least one, or both, of the address bus and data bus 122.

The restoration data can also comprise a unit of memory associated with the volatile memory 114, taken jointly or severally with any and all of the above described restoration data. The unit of memory can comprise one or more than one of, for example, a bit, a byte, a word, a page or other unit of memory. Similarly, the restoration data 128 can comprise processor context data indicative of the condition or state of the processor 110. It will be appreciated that processor context data is an example of the above described state information 112. Suitably, the circuitry 302 to identify restoration data can comprise circuitry to identify at least one of a unit of memory associated with the at least one predetermined type of memory operation or a processor context comprising at least one of one or more than one processor register value of the processor of the primary data processing system or the state information 112 associated with the processor 110 of the primary data processing system 102.

The monitor 118 also comprises output circuitry 304, or an output interface, for outputting or otherwise transferring the restoration data 128 to the secondary data processing system 104 via the communication link 126.

Figure 4:
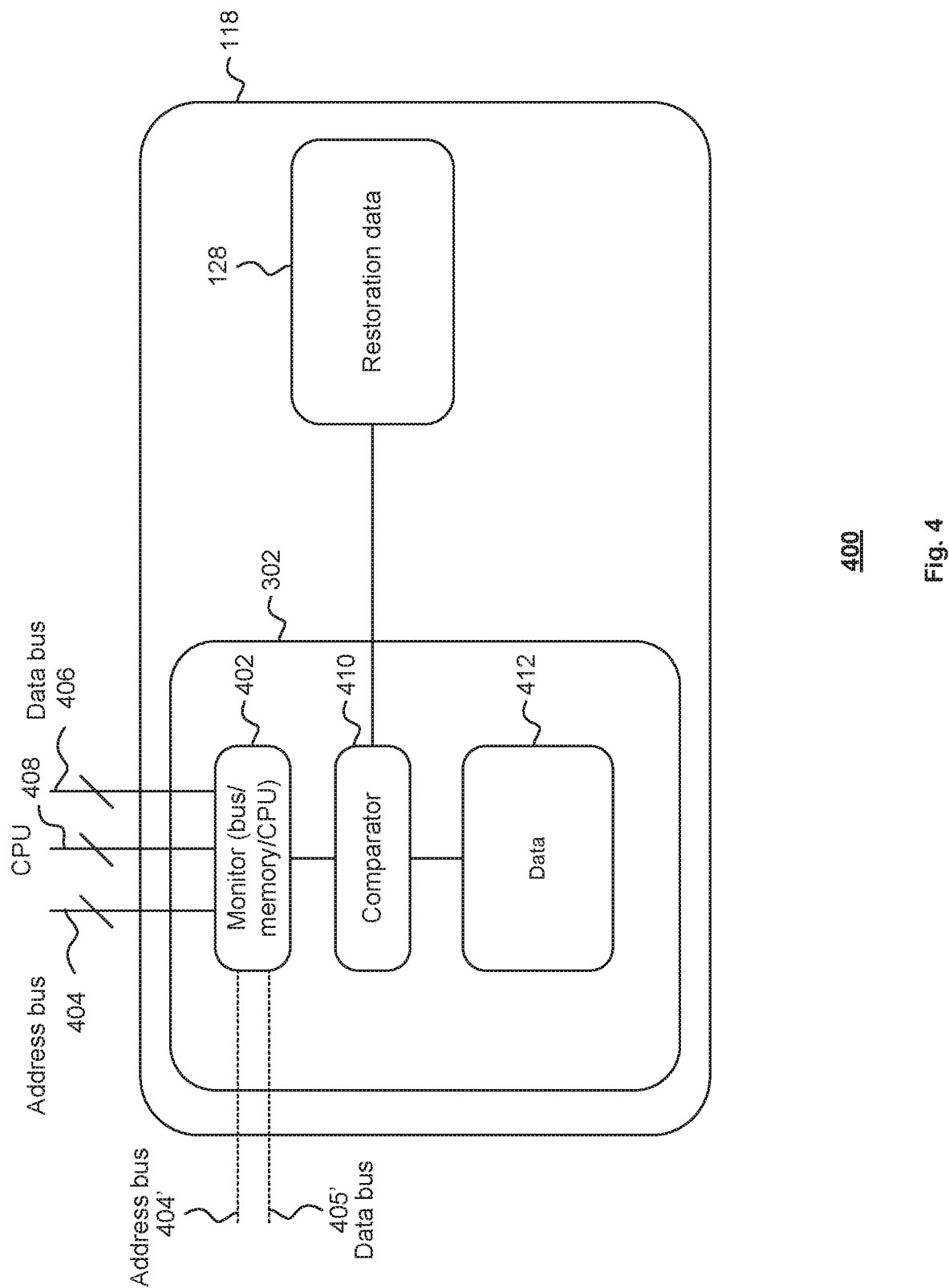
FIG. 4 shows the monitor of the primary processing system in greater detail according to example implementations.

Referring to FIG. 4, there is a view 400 of the monitor 118 of the primary processing systems in greater detail according to example implementations. The circuitry to identify restoration data 302 can comprise circuitry 402 to collate, or otherwise monitor, data associated with one or more than one of the address bus, data bus or CPU taken jointly or severally in any and all permutations. Such circuitry 402 is illustrated as being coupled to or otherwise having access to one, or both, of the address bus 404 and data bus 406. Such circuitry 402 will be referred to as sniffer circuitry since it performs a function similar to a packet sniffer. Example implementations in which the monitor 118 is interposed between the processor 110 and the volatile memory 114 will also provide for continuations of, or otherwise output, the address bus and the data bus, as represented by the dashed lines of the address bus 404' and data bus 406'. Also shown in FIG. 4 is the sniffer circuitry 402 being coupled to, or otherwise having access to, the state information 112 of the processor 110 via a respective processor interconnect 408.

Optionally, the monitor 118 can be arranged to accumulate the restoration data selectively as opposed to, for example, accumulating restoration data associated with every read, write, or other memory instruction, and/or all processor state information 112. Accordingly, the circuitry to identify restoration data 302 can further comprise a comparator 410. The comparator 410 can be arranged to compare data monitored by or accumulated by the sniffer circuitry 402 with data 412 stored within the circuitry 302 or otherwise being accessible to the circuitry 302. The comparator 410 to be arranged to determine or identify differences between such monitored or accumulated data and such stored data 412 so that differences or changes between the two form part of the restoration data 128 to be output for transfer to the secondary data processing system 104.

Figure 5:
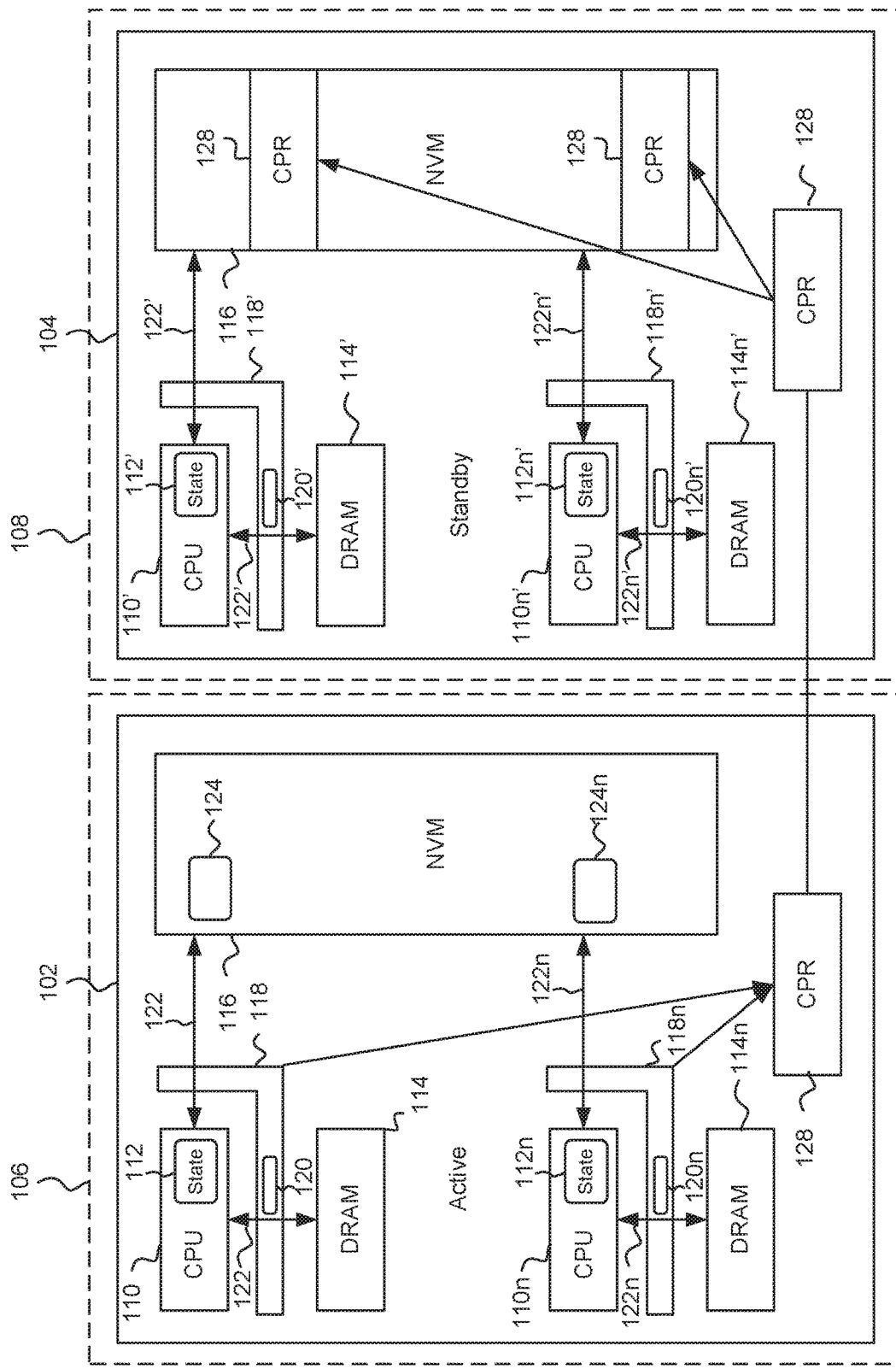
FIG. 5 depicts primary and secondary data processing system according to example implementations.

Referring to FIG. 5, there is shown a view 500 of the primary and secondary data processing systems according to example implementations. Reference numerals common to FIG. 5 and FIGS. 1 to 4 refer to the same entities. The primary data processing system 102 comprises a number of instances or sets of the monitor 118 arranged to derive restoration data from respective processors, volatile memories and persistent data 124 from non-volatile memories taken jointly and severally in any and all permutations. In the illustrated example, two sets or instances are provided. However, example implementations can be realized in which n sets are utilised. It can therefore be appreciated that a second monitor 118n is provided to operate in a comparable manner to the above described monitor 118 but in relation to a respective processor 110*n* and a respective non-volatile memory 114*n*. As indicated above, the second monitor 118*n* will monitor at least one, or both, of the address bus and data bus 122*n* and/or instructions 120*n* associated with the memory read instructions, write instructions or other memory instructions.

Also shown in FIG. 5 is the nonvolatile memory 116. It can be appreciated that a single nonvolatile memory 116 has been provided as serving all monitors 118, 118*n*. However, implementations are not limited to such an arrangement. Implementations can be realized in which each monitor 118, 118*n* is provided with, or otherwise has access to, a respective nonvolatile memory. In either case, the nonvolatile memory is used to store persistent data 124, 124*n* associated with the monitors 118, 118*n*.

As described above, the monitors 118, 118*n* are used to compile or collate restoration data 128. Although a single entity has been used to illustrate the restoration data 128, example implementations are not limited to such an arrangement. Examples can be realized in which each monitor 118, 118*n* accumulates respective restoration data 128 for transferring to the secondary data processing system 104.

The restoration data 128 is output or otherwise transferred to the secondary data processing system 104. Any restoration data 128 received by the secondary data processing system 104 is appropriately stored within the nonvolatile memory 116' of the secondary data processing system 104. Therefore, in the event of a failure associated with the primary data processing system 102, the stored restoration data 128 can be used to restore a respective processor 110', 110'*n* and/or volatile memory 114', 114'*n* to a state corresponding to that of the respective entities of the primary data processing system immediately before, or at the point of, the failure associated with the primary data processing system 102.

Figure 6:
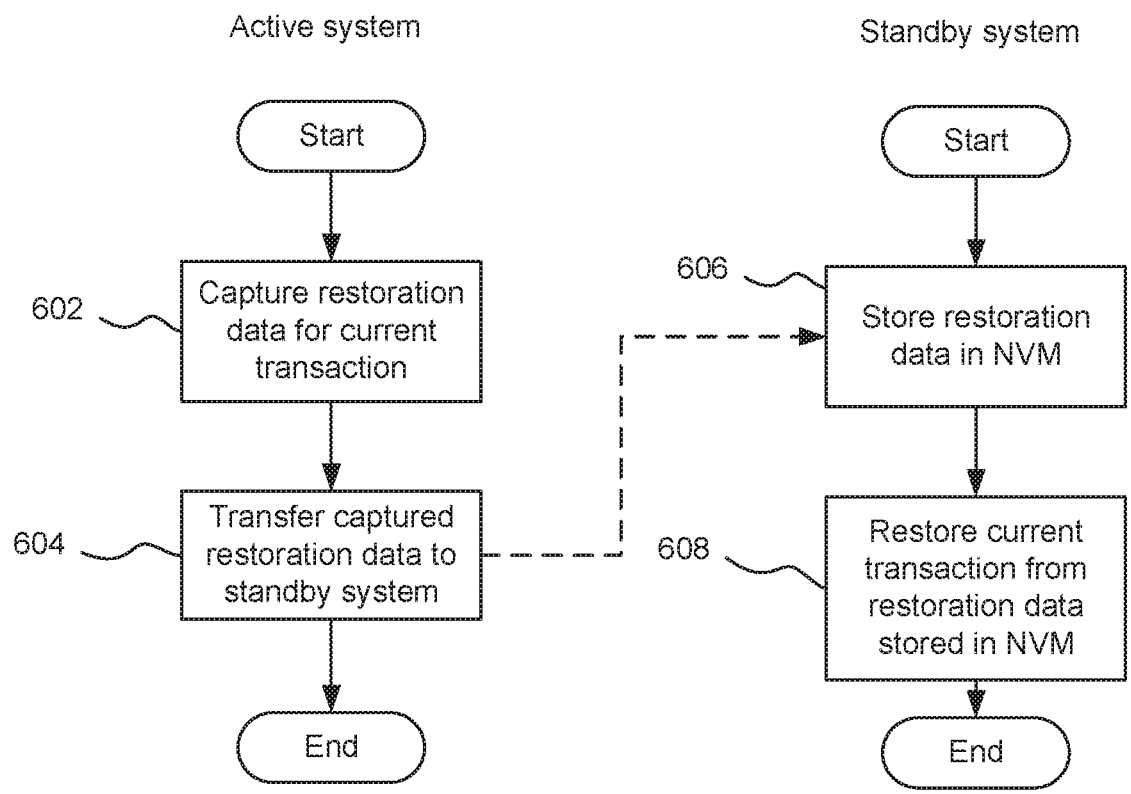
FIG. 6 shows flowcharts according to example implementations.

Referring to FIG. 6, there is shown a view 600 of pair of flowcharts according to example implementations. The flowcharts relate to the primary, or active, data processing system 102 and the secondary, or standby, data processing system 104. At 602, a monitor 118 of the primary data processing system 102 is arranged to capture restoration data. At 604, the captured restoration data is output for transfer to the secondary, or standby, data processing system 104.

At 606, any restoration data received by the secondary, or standby, data processing system 104 is stored in nonvolatile memory. In the event that a failure associated with the primary data processing system 102 is detected, the secondary, or standby, data processing system 104 is used, at 608, to continue to provide support for the computing service by using the stored restoration data to place a currently executing transaction into a state corresponding to that immediately before, or at the point of, the failure associated with the primary data processing system 102. Consequently, at least one, or both, of the processor 110', 110'*n* or nonvolatile memory 114', 114'*n* is conditioned or placed into a state or states corresponding to those of the 110, 110*n* and/or non-volatile memory 114, 114*n* immediately before, or at the point of, the failure associated with the primary data processing system.

Figure 7:
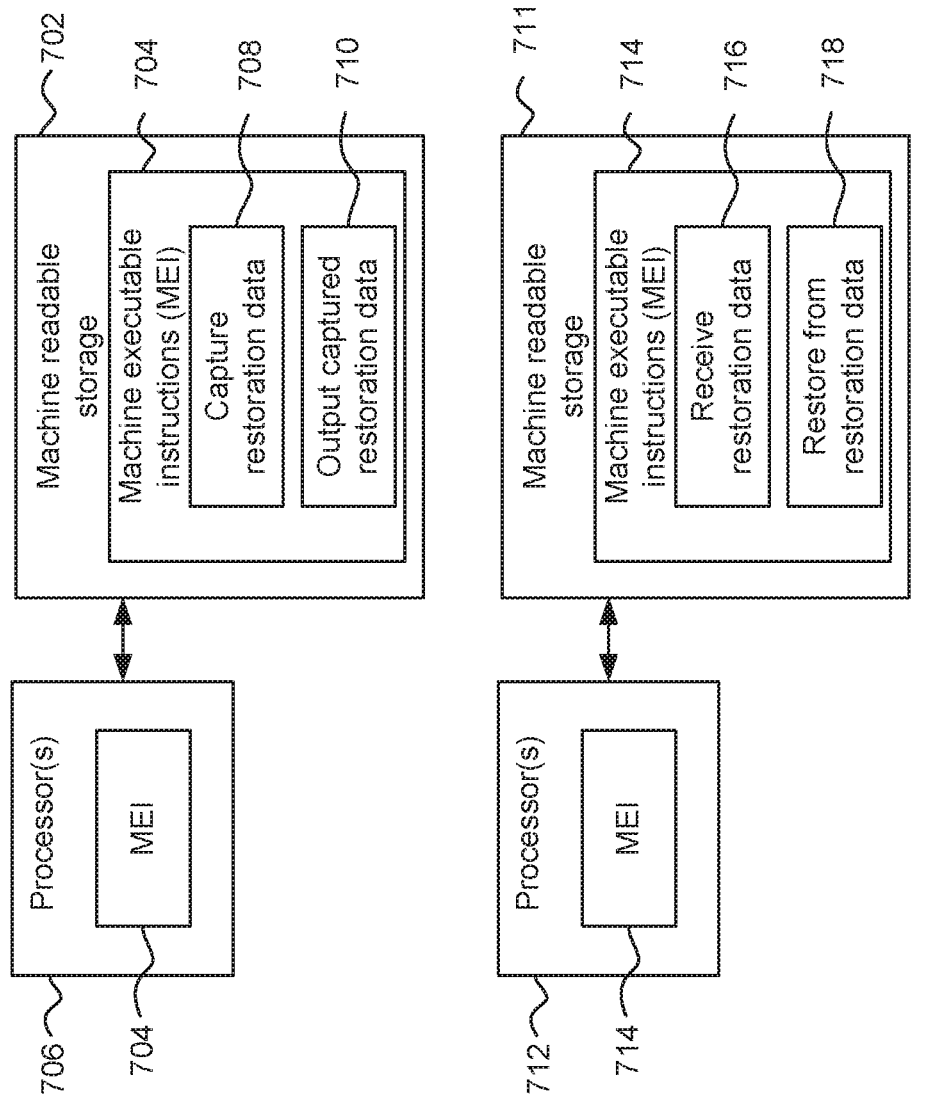
FIG. 7 illustrates computer program products according to example implementations.

Referring to FIG. 7, there is shown a view 700 of implementations of at least one of machine executable instructions or machine-readable storage. FIG. 7 shows machine readable storage 702. The machine-readable storage 702 can be realized using any type of volatile or non-volatile storage such as, for example, memory, a ROM, RAM, EEPROM, optical storage and the like. The machine-readable storage 702 stores machine executable instructions (MEIs) 704. The MEIs 704 comprise instructions that are executable by instruction execution circuitry 706 such as, for example, at least one or more than one of the above processors 110, 110*n*, 110', 110'*n*, monitors 118, 118', 118*n*, 118*n*' or other instruction execution circuitry taken jointly and severally in any and all permutations. The circuitry 706 is responsive to executing the MEIs 704 to perform any and all activities, operations, methods described and claimed in this application.

Therefore, circuitry 706 is responsive to machine executable instructions 708 to capture the restoration data by influencing, or otherwise controlling, the operation of one or more than one of the processors 110, 110', 110*n*, 110*n*' or monitors 118, 118*n*, 118', 118'*n* for performing any and all operations, activities or methods described and claimed in this application. Furthermore, the circuitry is responsive to machine executable instructions 710 to output the captured restoration data to the secondary data processing system 104.

At the secondary data processing system 104, machine readable storage 711 is provided that stores machine executable instructions (MEI) 714. The MEIs 714 comprise instructions for influencing or controlling the operation of instruction execution circuitry 712. The instruction execution circuitry 712 can comprise at least one of one or more than one of processor 110, 110', 110*n*, 110*n*' or the monitors 118, 118*n*, 118', 118'*n*. The instruction execution circuitry 712 is responsive to the MEIs 714 to perform any and all operations, activities or methods described and claimed in this application. Therefore, the MEIs 714 can comprise machine executable instructions 716 receiving the restoration data and storing the received restoration in the nonvolatile memory 116'. The MEIs can additionally comprise machine executable instructions 718 to restore the at least one or more than one of the processors 110, 110', 110*n*, 110*n*' or monitors 118, 118', 118*n*, 118*n*' to a state corresponding to that of the primary data processing system to a point or condition before, or immediately preceding, a failure associated with the primary data processing system 102.

Furthermore, it will be appreciated that at least one or more of the monitors 118, 118*n*, 118', 118'*n*, circuitry 302, 402, comparator 410 and data storage 412 can be an implementation of instruction execution circuitry 706, 712 for executing any such MEIs 704.

One of more than one of the example implementations can provide benefits in terms of scaling, performance and timing taken jointly and severally in any and all permutations.

Example implementations can be realized according to the following clauses:

Clause 1: An apparatus to support providing a computing service to a client including transferring control between a primary data processing system and a secondary data processing system in response to an event; the primary data processing system comprising a processor and associated memory and the secondary data processing system comprising a processor and associated memory; the apparatus comprising: circuitry to identify restoration data; the restoration data comprising at least data associated with at least one predetermined type of memory operation of the memory associated with the primary data processing system, and circuitry to output any identified restoration data for storage in the memory associated with the processor of the secondary data processing system.

Clause 2: The apparatus of clause 1, in which the circuitry to identify restoration data comprises circuitry to identify at least one of a unit of memory associated with the at least one predetermined type of memory operation or a processor context comprising at least one of one or more than one processor register value of the processor of the primary data processing system or state information associated with the processor of the primary data processing system.

Clause 3: The apparatus of any preceding clause, in which the memory of at least one of the primary data processing system or the secondary data processing system comprises at least one of volatile memory or non-volatile memory.

Clause 4: The apparatus of any preceding clause, in which the at least one predetermined type of memory operation comprises at least one of a read operation to access data in the memory associated with the processor of the primary data processing system or a write operation to store data in the memory associated with the processor of the primary data processing system.

Clause 5: The apparatus of any preceding clause, in which the circuitry to identify restoration data associated with at least one predetermined type of memory operation of the memory associated with the primary data processing system comprises a memory interface and a processor interface; the memory and processor interfaces comprising circuitry to support information exchanges between the memory and the processor and to store said information.

Clause 6: The apparatus of clause 5, in which said information is stored in a non-volatile memory associated with the processor of the primary data processing system.

Clause 7: The apparatus of clause 5, in at least one of the memory associated with the primary data processing system or the memory associated with the secondary data processing system is arranged to store said information.

Clause 8: An apparatus to support providing a computing service to a client including transferring control between a primary data processing system and a secondary data processing system in response to an event; the primary data processing system comprising a processor and associated memory and the secondary data processing system comprising a processor and associated memory; the apparatus comprising: circuitry to receive restoration data from the primary data processing system; the restoration data comprising at least data associated with at least one predetermined type of memory operation (read/write) of the memory associated with the primary data processing system, and circuitry to store any received restoration data in the memory associated with the processor of the secondary data processing system, circuitry, responsive to an event, to restore the computing service using the restoration data stored in the memory associated with the processor of the secondary data processing system.

Clause 9: A method to support providing a computing service to a client including transferring control between a primary data processing system and a secondary data processing system in response to an event; the primary data processing system comprising a processor and associated memory and the secondary data processing system comprising a processor and associated memory; the method comprising: identifying restoration data; the restoration data comprising at least data associated with at least one predetermined type of memory operation of the memory associated with the primary data processing system, and outputting any identified restoration data for storage in the memory associated with the processor of the secondary data processing system.

Clause 10: The method of clause 9, in which the identifying restoration data comprises identifying at least one of a unit of memory associated with the at least one predetermined type of memory operation or a processor context comprising at least one of one or more than one processor register value of the processor of the primary data processing system or state information associated with the processor of the primary data processing system.

Clause 11: The method of any of clauses 9 to 10, in which the memory of at least one of the primary data processing system or the secondary data processing system comprises at least one of volatile memory or non-volatile memory.

Clause 12: The method of any of clauses 9 to 11, in which the at least one predetermined type of memory operation comprises at least one of a read operation to access data in the memory associated with the processor of the primary data processing system or a write operation to store data in the memory associated with the processor of the primary data processing system.

Clause 13: The method of any of clause 9 to 12, in which identifying restoration data associated with at least one predetermined type of memory operation of the memory associated with the primary data processing system comprises supporting, via a memory interface and a processor interface, information exchanges between the memory and the processor and storing said information.

Clause 14: The method of clause 13, in which said information is stored in a non-volatile memory associated with the processor of the primary data centre.

Clause 15: The method of clause 14, in at least one of the memory associated with the primary data processing system or the memory associated with the secondary data processing system is arranged to store said information.

Clause 16: A method to support providing a computing service to a client including transferring control between a primary data processing system and a secondary data processing system in response to an event; the primary data processing system comprising a processor and associated memory and the secondary data processing system comprising a processor and associated memory; the method comprising: receiving restoration data from the primary data processing system; the restoration data comprising at least data associated with at least one predetermined type of memory operation of the memory associated with the primary data processing system, storing any received restoration data in the memory associated with the processor of the secondary data processing system, and restoring, in response to an event, the computing service using the restoration data stored in the memory associated with the processor of the secondary data processing system.

Clause 17: Machine executable instructions arranged, when executed by a processor, to implement a method of any of clauses 9 to 16.

Clause 18: Machine readable storage restoring machine executable instructions of claim 17.

The invention claimed is:

1. An apparatus to support providing a computing service to a client including transferring control between a primary data processing system and a secondary data processing system in response to an event, wherein the apparatus comprises:
   the primary data processing system comprising a first processor, a monitoring circuit, and a first associated memory,
   the secondary data processing system comprising a second processor and a second associated memory, and
   wherein the apparatus is configured to:

maintain, at the monitoring circuit of the primary data processing system, a list of memory operations between the primary data processing system and the secondary data processing system, wherein the list of memory operations correspond with memory operations since a first time of a completed transaction and a current time since the first time corresponding with the completed transaction;

at a second time and corresponding with the event, access restoration data corresponding with data associated with the list of memory operations between the first time and the second time;

access a transaction consistent state of the first processor of the primary data processing system, wherein the transaction consistent state of the first processor is before the second time; and transmit the restoration data and the transaction consistent state of the first processor to the secondary data processing system for storage in the second associated memory, wherein the second data processing system is enabled to provide the computing service to the client from the secondary data processing system.

2. The apparatus of claim 1, further configured to identify at least one of a unit of memory associated with the at least one predetermined type of memory operation or a processor context comprising at least one of one or more than one processor register value of the processor of the primary data processing system or state information associated with the processor of the primary data processing system.

3. The apparatus of claim 1, wherein the first associated memory or the second associated memory comprises at least one of volatile memory or non-volatile memory.

4. The apparatus of claim 1, wherein the first associated memory is configured to initiate at least one of a read operation to access data in the first associated memory associated with the first processor of the primary data processing system or a write operation to store data in the first associated memory associated with the first processor of the primary data processing system.

5. The apparatus of claim 1, wherein the first associated memory associated with the primary data processing system comprises a memory interface and a processor interface, and wherein the first associated memory and processor interfaces comprising circuitry to support information exchanges between the first associated memory and the first processor and to store said information.

6. The apparatus of claim 5, wherein the information is stored in a non-volatile memory associated with the first processor of the primary data processing system.

7. The apparatus of claim 1, wherein the list of memory operations is stored in a volatile memory associated with the first processor.

8. The apparatus of claim 1, wherein the list of memory operations is limited to read and write memory operations.

9. The apparatus of claim 1, wherein a second list of memory operations is stored in a volatile memory associated with the second processor.

10. The apparatus of claim 1, wherein the transaction consistent state is a trace mode.

11. The apparatus of claim 1, wherein the transaction consistent state is immediately before the second time.

12. An apparatus to support providing a computing service to a client including transferring control between a primary data processing system and a secondary data processing system in response to an event, wherein the apparatus comprises:

the primary data processing system comprising a first processor, a monitoring circuit, and a first associated memory, the secondary data processing system comprising a second processor and a second associated memory, and wherein the apparatus is configured to:

maintain, at the monitoring circuit of the primary data processing system, a list of memory operations between the primary data processing system and the secondary data processing system, wherein the list of memory operations correspond with memory operations since a first time of a completed transaction and a current time since the first time corresponding with the completed transaction;

at a second time and corresponding with the event, receive restoration data corresponding with data associated with the list of a memory operation between the first time and the second time;

access a transaction consistent state of the first processor of the primary data processing system, wherein the transaction consistent state of the first processor is before the second time;

store the restoration data and the transaction consistent state of the first processor in the second associated memory, wherein the second data processing system is enabled to provide the computing service to the client from the secondary data processing system; and restore the computing service using the restoration data stored in the second associated memory.

13. A method to support providing a computing service to a client including transferring control between a primary data processing system and a secondary data processing system in response to an event, the method comprising:

maintaining a list of memory operations between the primary data processing system and the secondary data processing system, wherein the list of memory operations correspond with memory operations since a first time of a completed transaction and a current time since the first time corresponding with the completed transaction;

at a second time and corresponding with the event, identifying restoration data associated with the list of memory operations between the first time and the second time;

accessing a transaction consistent state of the first processor of the primary data processing system, wherein the transaction consistent state of the first processor is before the second time; and outputting the restoration data and the transaction consistent state of the first processor to the secondary data processing system for storage in associated memory, wherein the second data processing system is enabled to provide the computing service to the client from the secondary data processing system.

14. The method of claim 13, wherein the memory operations comprise at least one processor register value of the first processor or state information associated with the first processor.

15. The method of claim 13, wherein the first associated memory is configured to initiate at least one of a read operation to access data in the associated memory or a write operation to store data in the associated memory.

16. The method of claim 13, wherein the method further comprises: supporting, via a memory interface and a processor interface, information exchanges between the associated memory and the first processor.

17. The method of claim 16, wherein the information is stored in a non-volatile memory associated with the first processor.

\* \* \* \* \*